US008446941B2

(12) United States Patent
Yang (10) Patent No.: US 8,446,941 B2
(45) Date of Patent: May 21, 2013

(54) EQUALIZER EMPLOYING ADAPTIVE ALGORITHM FOR HIGH SPEED DATA TRANSMISSIONS AND EQUALIZATION METHOD THEREOF

(75) Inventor: Choong Reol Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 337 days.

(21) Appl. No.: 12/881,586

(22) Filed: Sep. 14, 2010

(65) Prior Publication Data

US 2011/0317754 A1   Dec. 29, 2011

(30) Foreign Application Priority Data

Jun. 29, 2010 (KR) .................. 10-2010-0062334

(51) Int. Cl.
*H04L 2025/0349* (2006.01)
(52) U.S. Cl.
USPC .......................... 375/233; 375/232; 375/229
(58) Field of Classification Search
USPC ........................................................ 375/233
See application file for complete search history.

(56) References Cited

U.S. PATENT DOCUMENTS

| 7,206,365 | B2* | 4/2007 | Lin | 375/348 |
| 7,242,712 | B1* | 7/2007 | Katic | 375/233 |
| 7,266,146 | B2* | 9/2007 | Pare et al. | 375/232 |
| 7,340,000 | B1* | 3/2008 | Hart et al. | 375/260 |
| 2003/0223489 | A1* | 12/2003 | Smee et al. | 375/233 |
| 2004/0146129 | A1* | 7/2004 | Lin | 375/348 |
| 2006/0256849 | A1* | 11/2006 | Tseng et al. | 375/232 |
| 2007/0201308 | A1* | 8/2007 | Wassermann et al. | 367/82 |
| 2008/0056403 | A1* | 3/2008 | Wilson | 375/268 |
| 2008/0130807 | A1* | 6/2008 | Maalouli et al. | 375/354 |
| 2008/0159377 | A1* | 7/2008 | Allpress et al. | 375/233 |
| 2009/0067486 | A1* | 3/2009 | Casas et al. | 375/233 |
| 2010/0080282 | A1* | 4/2010 | Zhong et al. | 375/233 |
| 2010/0202507 | A1* | 8/2010 | Allpress et al. | 375/233 |
| 2011/0274154 | A1* | 11/2011 | Aziz et al. | 375/233 |
| 2012/0141122 | A1* | 6/2012 | Carusone et al. | 398/37 |

* cited by examiner

*Primary Examiner* — Sam K Ahn
*Assistant Examiner* — Santiago Garcia
(74) *Attorney, Agent, or Firm* — Staas & Halsey LLP (57) ABSTRACT

Disclosed are an equalizer and an equalization method employing an adaptive algorithm for high speed data transmissions. The equalizer includes: a subtraction unit subtracting a feedback signal from an input signal to generate a subtraction signal; a timing signal generation unit generating a sampling timing signal; an equalization signal generation unit equalizing the subtraction signal according to the sampling timing signal to generate an equalization signal; and a feedback signal generation unit calculating a filter coefficient value by using the subtraction signal and the equalization signal, delaying the equalization signal, and weighting the delayed equalization signal according to the filter coefficient value to generate a feedback signal.

11 Claims, 7 Drawing Sheets

FIG. 7

EQUALIZER EMPLOYING ADAPTIVE ALGORITHM FOR HIGH SPEED DATA TRANSMISSIONS AND EQUALIZATION METHOD THEREOF

CROSS-REFERENCE TO RELATED APPLICATIONS

This application claims the priority of Korean Patent Application No. 10-2010-0062334 filed on Jun. 29, 2010, in the Korean Intellectual Property Office, the disclosure of which is incorporated herein by reference.

BACKGROUND OF THE INVENTION

1. Field of the Invention

The present invention relates to an equalizer and an equalization method and, more particularly, to an equalizer and an equalization method for transmitting data at high speed.

2. Description of the Related Art

The IEEE STD 802.3.ba standard for a high speed Ethernet backplane stipulates that a 10G Ethernet transmission equalizer be employed in a channel transmission unit and a bit error rate (BER) performance of 10 to 12 or higher be provided when a 1-meter backplane PCB pattern is passed through. Thus, the design of an equalizer for a high speed Ethernet backplane is a critical factor in designing a high speed Ethernet backplane.

Figure 1:
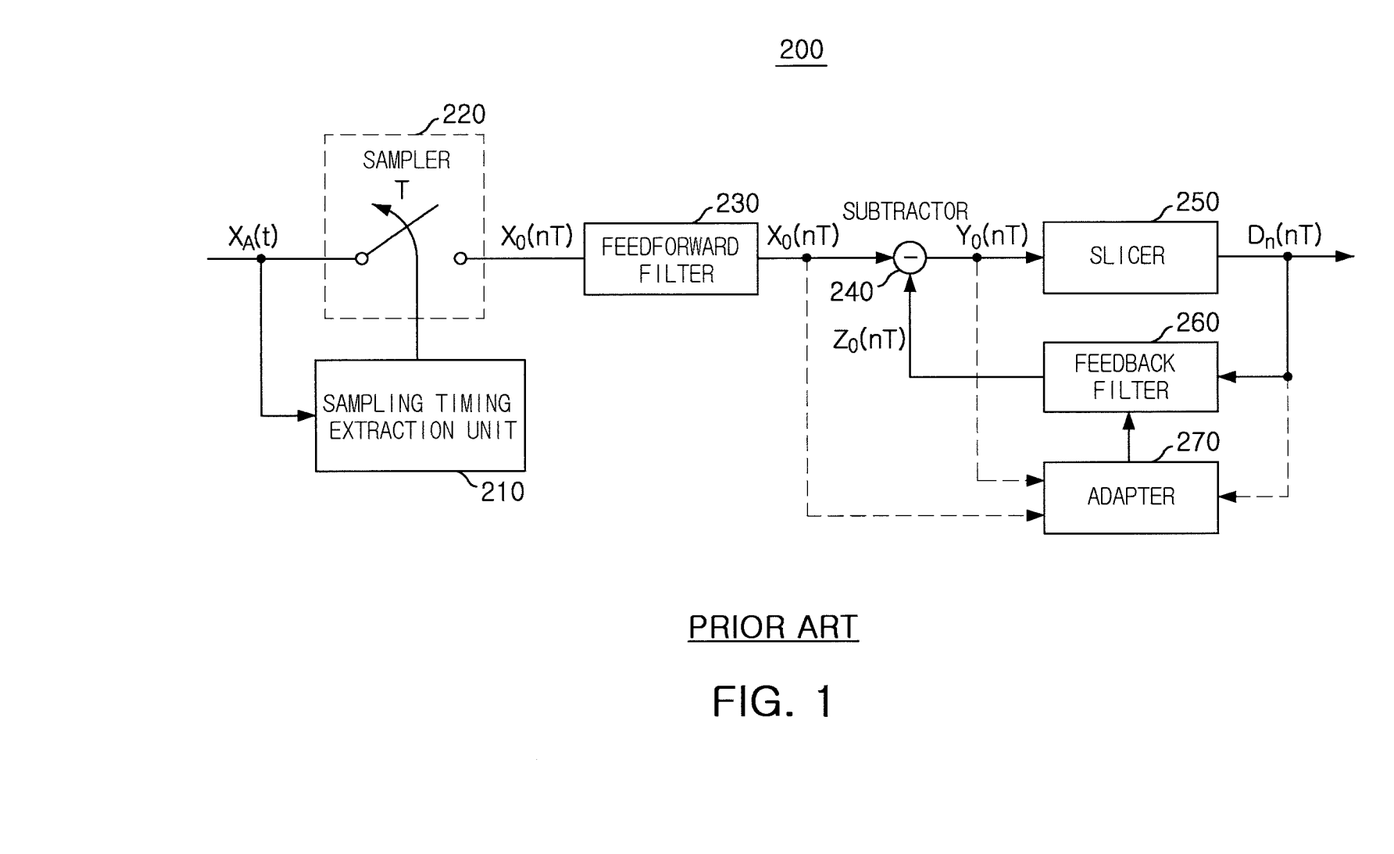
FIG. 1 is a schematic block diagram showing the overall structure of the existing decision feedback equalizer.

FIG. 1 illustrates an overall structure of the existing decision feedback equalizer.

With reference to FIG. 1, the existing decision feedback equalizer 200 includes a sampling timing extraction unit 210, a sampler 220, a feedforward filter 230, a subtractor 240, a slicer 250, a feedback filter 260, and an adapter 270.

The operation of the decision feedback equalizer 200 will now be described.

In a non-equilibrium state, the sampling timing extraction unit 210 acquires a sampling timing (T) by using a reception signal $X_A(t)$, and after compensation is made through the decision feedback equalizer 200, the sampling timing extraction unit 210 determines a sampling timing by using an output signal $Y_o(nT)$.

The sampler 220 samples the analog input signal $X_A(t)$ according to the sampling timing (T) to generate a digital input signal $X_O(nT)$. Namely, the sampler 220 serves to digitalize the input signal. The carrier frequency is high in high speed data communication, so the sampling frequency accordingly needs to become high in order to avoid aliasing.

The feedforward filter 230 and the feedback filter 260 of the decision feedback equalizer 200 are elements for removing a precursor inter-symbol interference (ISI) and a postcursor ISI, respectively.

The subtractor 240 subtracts a digital feedback signal $Z_O(nT)$, acquired from a signal before one period, from the digital input signal $X_O(nT)$ which has passed through the feedforward filter 230. When the feedback signal is subtracted, the post-cursor ISI is canceled.

When the subtracted signal is sliced by the slicer 250, a digital equalization signal $D_n(nT)$ is obtained.

The feedback filter 260 delays and weights the digital equalization signal $D_n(nT)$ to generate a feedback signal.

The adapter 270 calculates a tap coefficient to be used when the feedback filter 260 weights each delayed digital equalization signal and delivers it to the feedback filter 260. In this case, the adapter 270 must calculate the tap coefficient such that it can sufficiently compensate for a channel. Thus, a tap coefficient calculation method of the adapter 270 may differ, depending on a channel situation or a field of application for the equalizer. Also, the adapter 270 may not be used according to a channel situation.

When a channel situation is not fixed or poor, an adaptive adapter for updating a tap coefficient according to an environment may be used.

In general, on-time sampling is performed in an area where eyes are widest. In this respect, when crosstalk induced jitter (CIJ), signal attenuation, and the like, exist in a channel, the size of eyes are relatively closed, making it difficult to expect maximum eye opening at on-time.

Also, in a case in which a high speed backplane distributedly delivers 400 Gb/s of data through multiple channels, each having 10 Gb/s bandwidth, a reflection loss, crosstalk, jitter, and the like, affect the respective adjacent channels at transmission and reception backplane connector parts. Thus, in order to prevent severe degradation of reception performance due to increased loss and noise, the channels need to be sufficiently compensated for.

SUMMARY OF THE INVENTION

An aspect of the present invention provides an equalizer and equalization method employing an adaptive algorithm capable of reducing interference influence on channels by signals which have passed through the channels in a backplane performing high speed data communication.

According to an aspect of the present invention, there is provided an equalizer including: a subtraction unit subtracting a feedback signal from an input signal to generate a subtraction signal; a timing signal generation unit generating a sampling timing signal; an equalization signal generation unit equalizing the subtraction signal according to the sampling timing signal to generate an equalization signal; and a feedback signal generation unit calculating a filter coefficient value by using the subtraction signal and the equalization signal, delaying the equalization signal, and weighting the delayed equalization signal according to the filter coefficient value to generate a feedback signal.

The feedback signal generation unit may include: an adapter unit obtaining the filter coefficient value according to a sign regressor least mean square (LMS) algorithm by using the subtraction signal and the equalization signal; and a filter unit sequentially delaying equalization signals and weighting each of the delayed equalization signals by using the filter coefficient value.

The adapter unit may include: an error extractor extracting an error value by using a load value and an equalization signal value of the equalization signal; and a tap coefficient calculator calculating the filter coefficient value by using the error value and the equalization signal.

The adapter unit may further include a variance calculator calculating a statistical variance value of the error value, and the tap coefficient calculator may compare a variance value calculated during a previous period and a variance value calculated during a current period, and when the variance value of the current period is smaller, the tap coefficient calculator may calculate a filter coefficient value and update it to the filter unit, whereas when the variance value of the current period is greater or equal, the tap coefficient calculator may maintain the filter coefficient value of the previous period.

The variance value calculated by the variance calculator may be a variance value of the square of the error value extracted by the error extractor.

The feedback signal generation unit may further include: a signal conversion unit converting an output signal from the filter unit into an analog signal.

The signal conversion unit may include: a zero order hold (ZOH) converting the output signal from the filter unit into an analog signal; and a low pass filter (LPF) filtering the signal which has been converted by the ZOH.

The equalization signal generation unit may include: a sampling unit sampling the subtraction signal according to the timing signal to output a sampled signal; and a slicing unit slicing the sampled signal to generate an equalization signal.

The equalization signal generation unit may further include: a delay buffer unit delaying the equalization signal and outputting the delayed equalization signal.

The equalizer may be implemented in a serializer/deserializer.

According to another aspect of the present invention, there is provided an equalization method including: a subtraction signal generation operation of subtracting a feedback signal, acquired from a signal during an immediately previous period, from an input signal to generate a subtraction signal; an equalization operation of generating an equalization signal from the subtraction signal by using a sampling timing signal; a filter coefficient updating operation of calculating a filter coefficient value by using the subtraction signal and the equalization signal and updating the filter coefficient value; and a feedback signal generation operation of delaying the equalization signal and weighting the delayed equalization signal according to the calculated filter coefficient value to generate a feedback signal.

The filter coefficient updating operation may include: an error value extraction operation of extracting an error value, a difference value between the subtraction signal and the equalization signal; and a tap coefficient calculation operation of calculating a tap coefficient according to a sign regressor least mean square (LMS) algorithm by using the error value and a code value of the error value.

The filter coefficient updating operation may include: an error value extraction operation of extracting an error value, a difference value between the subtraction signal and the equalization signal; a variance value calculation operation of calculating a statistical variance value of the error signal; a variance value comparison operation of comparing the size of a variance value calculated during a previous period and that of the calculated variance value; and a tap coefficient calculation operation of calculating the tap coefficient according to the sign regressor LMS algorithm by using the error value and the code value of the error value, wherein when a variance value of the current period is smaller than a variance value calculated during a previous period in the variance value comparison operation, the tap coefficient calculation operation may be performed, and when the variance value of the current period is greater than or equal to the variance value calculated during the previous period, the filter coefficient value of the previous period may be maintained.

The variance value may be a variance value of the square of the error value extracted during the error value extraction operation.

The method may further include: an output operation of outputting the equalization signal generated during the equalization operation.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert from the gist of the present invention, such explanation will be omitted but would be understood by those skilled in the art.

In the drawings, the shapes and dimensions may be exaggerated for clarity, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

Figure 2:
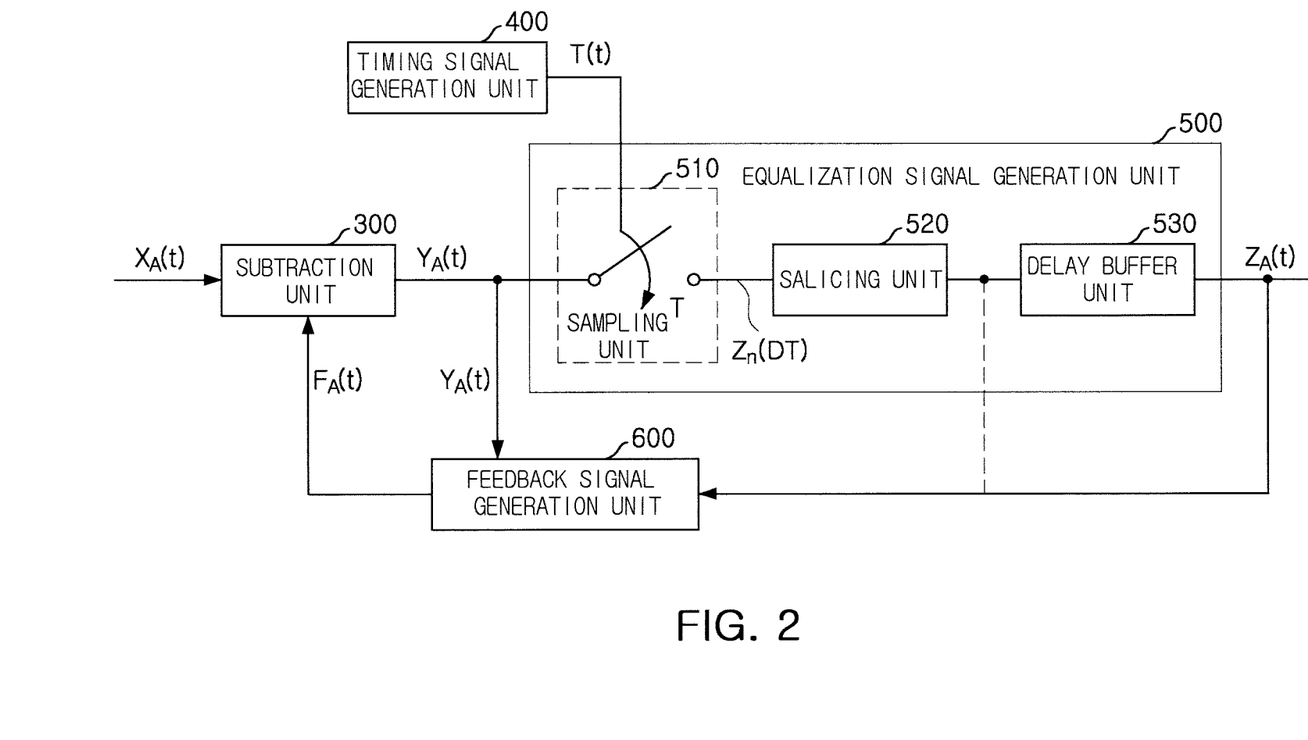
FIG. 2 is a schematic block diagram showing the overall structure of an equalizer employing an adaptive algorithm for high speed data transmissions according to an exemplary embodiment of the present invention.

FIG. 2 is a schematic block diagram showing the overall structure of an equalizer employing an adaptive algorithm for high speed data transmissions according to an exemplary embodiment of the present invention.

With reference to FIG. 2, the equalizer according to an exemplary embodiment of the present invention may be configured to include a subtraction unit 300, a timing signal generation unit 400, an equalization signal generation unit 500, and a feedback signal generation unit 600.

The subtraction unit 300 subtracts an analog feedback signal $F_A(t)$ transmitted from the feedback signal generation unit 600 from analog input signal $X_A(t)$ to generate a subtraction signal $Y_A(t)$. The subtraction unit 300 removes a post-cursor ISI from the input signal $X_A(t)$ by using the feedback signal $F_A(t)$. Unlike the related art decision feedback equalizer, the subtraction unit 300 according to an exemplary embodiment of the present invention receives the analog signal as an input signal.

The timing signal generation unit 400 generates a sampling timing signal T(t) required for the equalization signal generation unit 500 to perform sampling. The sampling timing signal T(t) may be generated by using the analog input signal $X_A(t)$, the subtraction signal $Y_A(t)$, or an analog equalization signal $Z_A(t)$.

The equalization signal generation unit 500 equalizes the subtraction signal according to the sampling timing signal T(t) to generate the analog equalization signal $Z_A(t)$. Unlike the related art, the equalization signal generation unit 500 generates the analog equalization signal from the analog subtraction signal $Y_A(t)$.

The feedback signal generation unit 600 generates an analog feedback signal, to be used for removing a post-cursor ISI from an input signal of the next period, from the equalization signal $Z_A(t)$. The feedback signal generation unit 600 calculates a filter coefficient value by using the subtraction signal $Y_A(t)$ and the equalization signal $Z_A(t)$. The feedback signal generation unit 600 weights a signal obtained by delaying the equalization signal by using the calculated filter coefficient value to generate a feedback signal $F_A(t)$.

The feedback signal generation unit 600 uses a digital filter, so it may further include a unit for converting a filtered digital signal into an analog signal.

In comparison with reference to FIGS. 1 and 2, it is noted that the equalizer according to an exemplary embodiment of the present invention does not have a feedforward filter 230 and the switch unit 220 provided at a front stage of the subtraction unit 240.

The feedforward filter 230 is eliminated for the reason that it may generate noise to thereby degrade the system. Thus, the post-cursor ISI must be removed to its maximum level by using the feedback filter. To this end, the filter coefficient value of the feedback signal generation unit 600 needs to be adaptively changed over a channel and converged at a fast rate.

Also, the input signal $X_A(t)$, the subtraction signal $Y_A(t)$, the feedback signal $F_A(t)$, and the equalization signal $Z_A(t)$, those used for the equalization process, are all analog signals.

Thus, if a system requires a relatively high data transfer rate, a high speed ADC may be employed or a sampler may be connected to a front stage of a slicer in order to compensate in an analog form. Thus, in FIG. 2, a sampling unit 510 is disposed at a front stage of a slicing unit 520.

With reference to FIG. 2, the equalization signal generation unit 500 may include the sampling unit 510 sampling the subtraction signal $Y_A(t)$ according to a sampling timing, and the slicing unit 520 converting a sampled signal $Z_D(nT)$ into an analog signal. The equalization signal generation unit 500 according to an exemplary embodiment of the present invention may further include a delay buffer unit 530 delaying the sliced signal $Z_A(t)$ and outputting the delayed sliced signal.

The sampling unit 510 samples the subtraction signal YA(t) transmitted from the subtraction unit by using the timing signal T(t) received from the timing signal generation unit 400 to generate the digital equalization signal $Z_D(nT)$. A receiver of a system that requires a high speed data transfer rate requires a high speed ADC, so in an exemplary embodiment of the present invention, the sampling unit 510 is disposed at a front stage of the slicing unit 520 to compensate for an analog input signal.

The slicing unit 520 converts the digital equalization signal $Z_D(nT)$ into the analog equalization signal $Z_A(t)$ by using a slicer.

The delay buffer unit 530 delays the analog equalization signal $Z_A(t)$ to compensate for a sampling position. If the sampling timing is not compensated, an eye diagram would be affected due to influence from a previous symbol. Thus, the sampling timing is compensated by using the delay buffer unit 530 to acquire a relatively clear eye diagram.

In the backplane for high speed data communication, the eye diagram is highly likely to be affected by a noise component, ISI, and the like, resulting from a channel environment, and the like, so generally, the delay buffer unit 530, the sampling unit 510 and the slicing unit 520 are simultaneously implemented.

Figure 3:
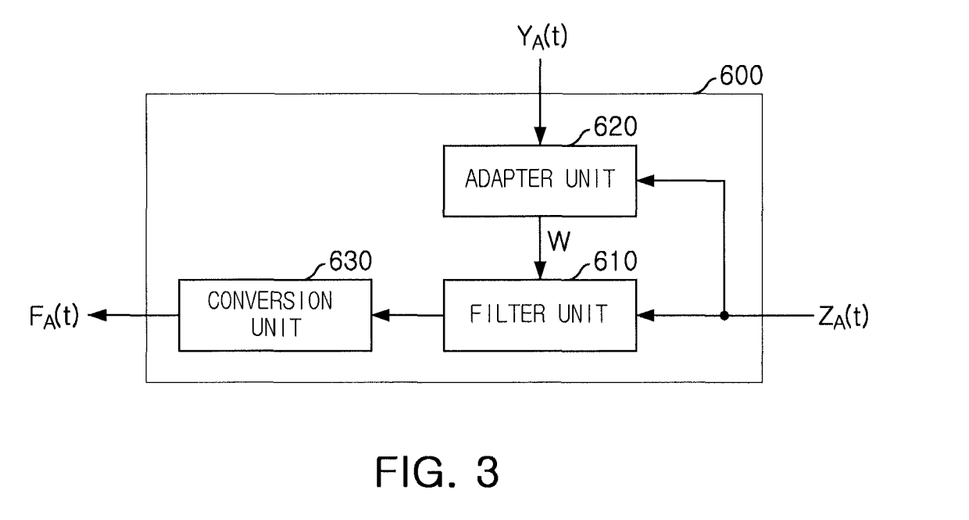
FIG. 3 is a schematic block diagram of a feedback signal generation unit of the equalizer employing an adaptive algorithm for high speed data transmissions according to an exemplary embodiment of the present invention.

FIG. 3 is a schematic block diagram of a feedback signal generation unit of the equalizer employing an adaptive algorithm for high speed data transmissions according to an exemplary embodiment of the present invention.

With reference to FIG. 3, the feedback signal generation unit 600 may include a filter unit 610 and an adapter unit 620. In addition, the feedback signal generation unit 600 may further include a conversion unit 630.

The adapter unit 620 obtains the filter coefficient value by applying a sign regressor least mean square (LMS) algorithm to the subtraction signal and the equalization signal.

Unlike an LMS algorithm that uses the input signal $Y_A(t)$ as it is, the sign regressor LMS algorithm performs the LMS algorithm by using the result obtained by inputting an input signal into a sign function. Also, when an error value required for the LMS algorithm is calculated, the result obtained by inputting the input signal to the sign function is used. A detailed operation of the sign regressor LMS algorithm will be described later.

The filter unit 610 digitally filters the equalization signal $Z_A(t)$ by using the filter coefficient calculated by the adapter unit 620. For the digital filtering, a plurality of delay taps and a multiplier for performing weighting, and the like, may be included.

Figure 5:
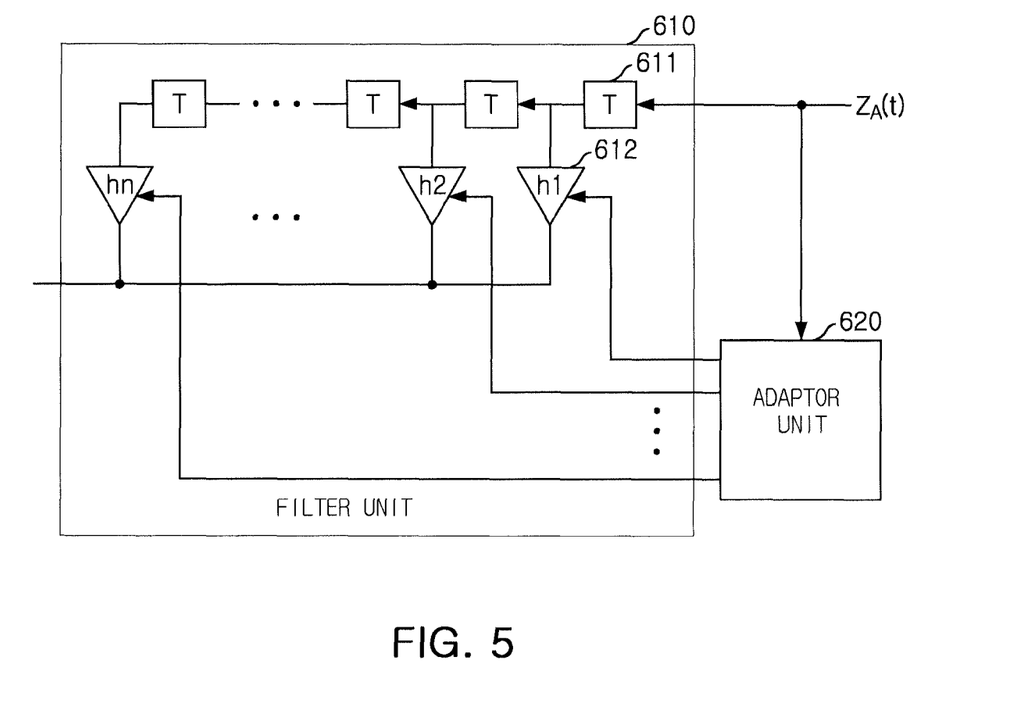
FIG. 5 is a detailed block diagram of a filter unit of the equalizer employing an adaptive algorithm for high speed data transmissions according to an exemplary embodiment of the present invention.

With reference to FIG. 5, the filter unit 610 includes n number of delay taps 611 and n number of multipliers 612. Although not shown, the filter unit 610 may further include an adder for adding outputs from the respective multipliers 612. Filter coefficients $\{h1, h2, \ldots, hn\}$ calculated by the adapter unit 620 are inputted to the respective multipliers 612 and are multiplied with an input signal which has been delayed by a corresponding index.

The number (n) of the delay taps 611 and the multipliers 612 may vary depending on a channel situation, a precision level required by the equalizer, and the like.

The conversion unit 630 converts the digital feedback signal $F_D(t)$ received from the filter unit 610 into an analog feedback signal $F_A(t)$. Although not shown, the conversion unit 630 may be configured to include a zero-order-hold (ZOH) generally used to convert a digital signal into an analog signal.

When the ZOH is used, there is still a discontinuous component, so in order to generate a better analog signal, the conversion unit 630 may additionally include a low pass filter (LPF) for removing an RF component forming a discontinuous component of the analog feedback signal $Z_A(t)$. The use of the LPF also obtains an effect in which eyes of the eye diagram are opened and widened.

Figure 4:
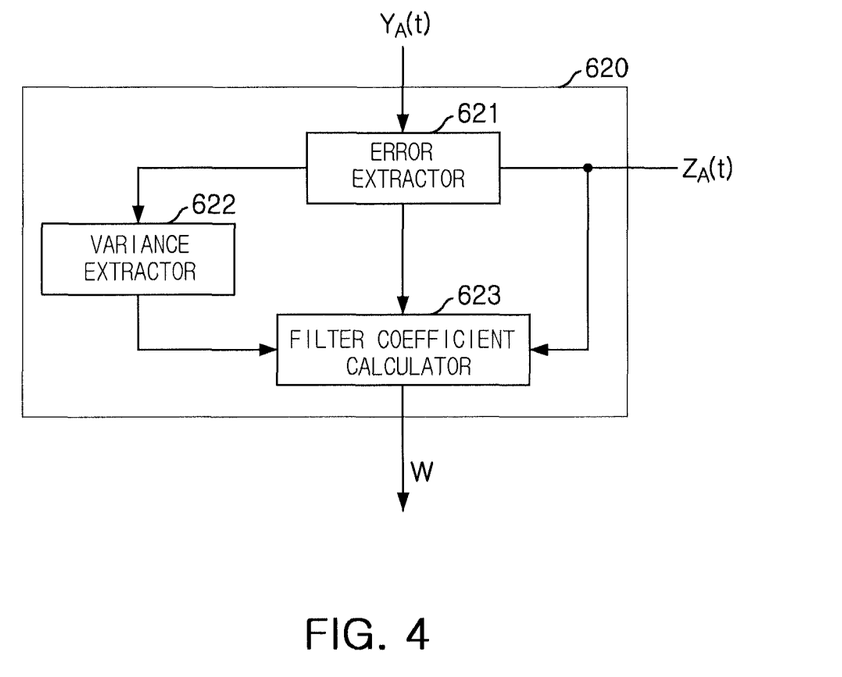
FIG. 4 is a schematic block diagram of an adapter of the equalizer employing an adaptive algorithm for high speed data transmissions according to an exemplary embodiment of the present invention.

FIG. 4 is a schematic block diagram of an adapter of the equalizer employing an adaptive algorithm for high speed data transmissions according to an exemplary embodiment of the present invention.

With reference to FIG. 4, the adapter unit 620 may be configured to include an error extractor 621, a variance extractor 622, and a filter coefficient calculator 623.

Before explaining the operation of the adaptor unit 620, the sign regressor LMS algorithm applied to the adapter according to an exemplary embodiment of the present invention will now be described.

The existing LMS algorithm is represented by Equation 1 shown below:

$$W_{k+1} = W_k + \mu(-\nabla_k) = W_k + \mu e_k X_k \quad \text{[Equation 1]}$$

In Equation 1, $W_{k+1}$ is a filter coefficient value to be currently used, $W_k$ is a filter coefficient value previously used. $\mu$ is a gain constant, which is previously set according to a channel state, $e_k$ is an estimated error value, and $X_k$ is an input signal value.

In this manner, the existing LMS algorithm improves a signal-to-noise ratio (SNR) by minimizing the estimated error value $e_k$.

However, because the existing LMS algorithm uses the input data $X_k$, a convergence rate is low. Thus, in order to solve this problem, the present invention proposes the sign regressor LMS algorithm in which a filter coefficient is obtained by using a sign value of the input data $X_k$.

The filter coefficient in the sign regressor LMS algorithm is calculated by using Equation 2 shown below:

$$W_{k+1} = W_k + \mu e_k \text{sgn}(X_k) \quad \text{[Equation 2]}$$

Also, an estimated error value is calculated by using Equation 3 shown below:

$$e_k = \text{sgn}(X_k) - X_k \quad \text{[Equation 3]}$$

With reference to FIG. 3, an error value is obtained by subtracting the input data $X_k$ from a sign value 1 or −1 of the input data $X_k$, and generally, the level of a reception signal is low, so the value of the input data $X_k$ is also small, and thus, the error value $e_k$ increases.

Thus, compared with the existing LMS algorithm, the influence of the currently inputted signal can be more actively reflected and a fast convergence speed can be obtained during the initial operation.

In this case, however, there is a possibility that the error value is diverged, rather than converged. Also, when the equalizer is implemented by using only the feedback filter, as in the exemplary embodiment of the present invention, the error value is highly likely to be diverged.

Thus, in order to prevent the error value from being diverged, the equalizer according to an exemplary embodiment of the present invention statistically analyzes an absolute value of errors and fixes a filter coefficient as necessary. In detail, the variance of the absolute value of the errors is obtained, and the filter coefficient is then maintained at a point where the divergence is minimized.

The obtaining of the absolute value of the errors according to an exemplary embodiment of the present invention is represented by Equation 4 and Equation 5 shown below:

$$M_e = \frac{1}{N} \sum_{k=1}^{N} (\text{sgn}(X_k) - X_k)^2 = \frac{1}{N} \sum_{k=1}^{N} e_k^2 \quad \text{[Equation 4]}$$

$$V_e = \frac{1}{N} \sum_{k=1}^{N} (e^2 - M_e)^2 \quad \text{[Equation 5]}$$

$V_e$ is a variance value of an error. Whether to maintain or update a filter coefficient can be determined by comparing $V_e$ of the previously period and $V_e$ of the current period. Namely, when the $V_e$ of the previous period is greater than that of the current period, it means that the variance of the error was reduced, so the filter coefficient must be calculated to be updated in the current period, or otherwise, it means that the variance of the error was increased, so the filter coefficient of the previous period is maintained.

In order to implement the sign regressor LMS algorithm as described above, the error extractor 621 according to an exemplary embodiment of the present invention receives the subtraction signal $Y_A(t)$ and the equalization signal $Z_A(t)$ and extracts a difference value between the two signals. In terms of the operational characteristics of the slicing unit 520, a sign value of the subtraction signal can be obtained, so, as a result, the difference value is the error value proposed by Equation 3.

The variance extractor 622 compiles statistics of the error values extracted by the error extractor 621 to obtain a variance value of the absolute value of the errors. Whether to use to variance extractor 622 may depend on a channel situation. Namely, when the converging of an error value is not easy because of a poor channel environment, the variance extractor 622 may be operated to determine whether to update or maintain the filter coefficient value.

The filter coefficient calculator 623 may calculate the filter coefficient according to Equation 2 by using the equalization signal $Z_A(t)$ and the error value extracted by the error extractor 61. The calculated filter coefficient (W) is delivered to the filter unit 610.

When a variance value of the error absolute value is received from the variance extractor 622, the variance value of the previous period and that of the current period are compared, and in the case that the variance value has been reduced, the filter coefficient calculator 623 may calculate the filter coefficient. When the variance value has been increased, because it does not have a point where the variance value is minimized, the filter coefficient does not need to be updated, and thus, a filter coefficient does not need to be calculated.

As described above, because the equalizer employing the sign regressor LMS algorithm is in use, a channel situation can be more flexibly and quickly coped with, compared with the equalizer employing the existing LMS algorithm, and stable operation can be guaranteed.

A transmission system using the equalizer according to an exemplary embodiment of the present invention will now be described.

When a 2-PAM signal passes through a backplane channel, it undergoes an extremely poor channel environment, and the eyes of a reception signal are closed due to an ISI of the channel.

Thus, in order to avoid this problem, a transmission pre-equalizer previously distorts (or pre-distorts) a transmission value and transmits the same, so that a reception end can acquire a signal with a smaller ISI.

The transmission end previously compensates a channel through a 5-tap transmission pre-equalizer and transmits it through a channel. The reception end may equalize the reception signal by using a 5-tap equalizer employing the sign regressor LMS algorithm to acquire a signal having relatively wide-open eyes.

Figure 6:
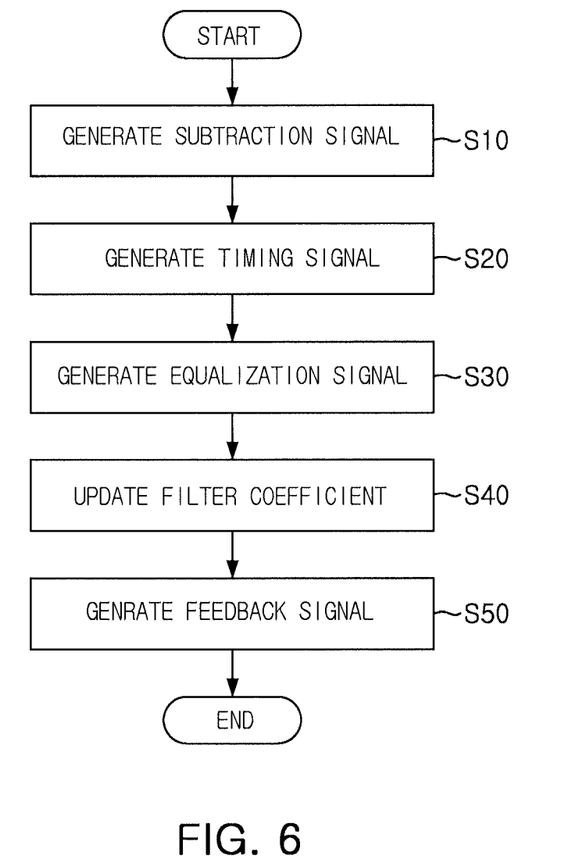
FIG. 6 is a flow chart illustrating the process of an equalization method employing an adaptive algorithm for high speed data transmissions according to an exemplary embodiment of the present invention.

FIG. 6 is a flow chart illustrating the process of an equalization method employing an adaptive algorithm for high speed data transmissions according to an exemplary embodiment of the present invention.

The equalization method according to an exemplary embodiment of the present invention may include a subtraction signal generation step (S10), a timing signal generation step (S20), an equalization signal generation step (S30), a filter coefficient updating step (S40), and a feedback signal generation step (S50).

In the subtraction signal generation step (S10), an analog subtraction signal may be generated by subtracting an analog feedback signal from an analog input signal. The subtraction signal generated in the subtraction signal generation step (S10) may be used in the equalization signal generation step (S30) or in the timing signal generation step (S20). In the subtraction signal generation step (s10), a post-cursor ISI included in the input signal can be removed by subtracting the feedback signal from the input signal.

In the timing signal generation step (S20), a sampling timing signal required for sampling the subtraction signal in the equalization signal generation step (S30) may be generated. The sampling timing signal may be generated by using the input signal, the subtraction signal or the equalization signal.

In the equalization signal generation step (S30), the subtraction signal may be sampled according to the sampling timing signal and then converted into an analog signal to generate an analog equalization signal. Also, the equalization signal generation step (S30) may include a step of correcting the sampling timing by applying a delay to the analog equalization signal.

In the filter coefficient updating step (S40), a filter coefficient value may be calculated by applying a sign regressor LMS algorithm to the subtraction signal and the equalization signal, and updated.

In terms of the operational characteristics of the slicing unit, the equalization signal is equal to a resultant value obtained by substituting the subtraction signal to a sign function. Thus, the sign regressor LMS algorithm can be applied by using the subtraction signal and the equalization signal, without having to use a sign function device.

Matters related to the application of the sign regressor LMS algorithm will now be described.

In the feedback signal generation step (S50), an analog feedback signal is generated by using the filter coefficient value and the equalization signal. To this end, the digital filter and the ZOH may be used.

Although not shown, an output step of outputting the equalization signal generated in the equalization signal generation step (S30) may be additionally performed. The output step may be performed in parallel with the filter coefficient updating step (S40) and the feedback signal generation step (S50).

Figure 7:
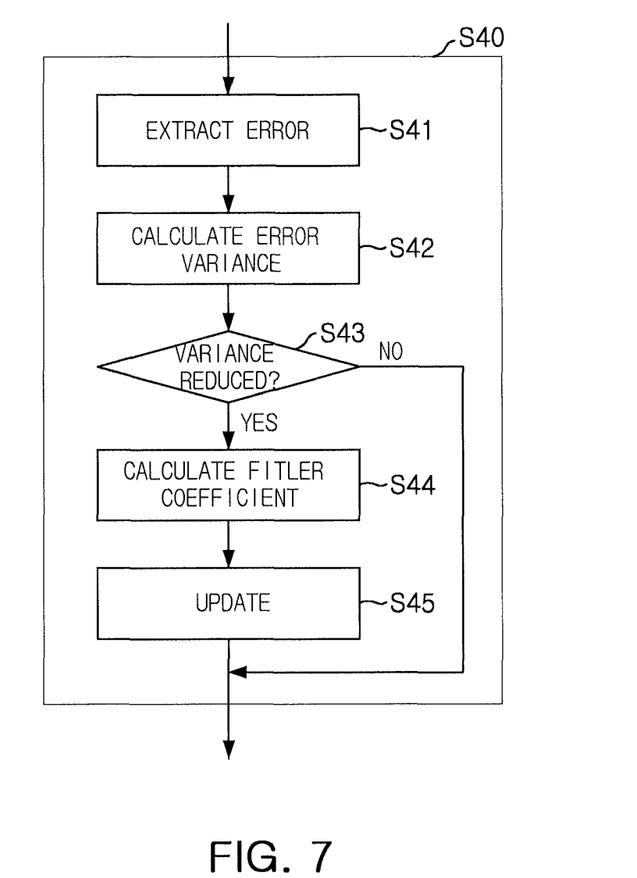
FIG. 7 is a flow chart illustrating the process of a filter coefficient updating operation of the equalization method employing an adaptive algorithm for high speed data transmissions according to an exemplary embodiment of the present invention.

FIG. 7 is a flow chart illustrating the process of a filter coefficient updating operation of the equalization method employing an adaptive algorithm for high speed data transmissions according to an exemplary embodiment of the present invention.

With reference to FIG. 7, the filter coefficient updating step (S40) may include an error extraction step (S41), a filter coefficient calculation step (S44), and an updating step (S45). The filter coefficient updating step (S40) may further include an error variance calculation step (S42) and a variance reduction determining step (S43).

In the filter coefficient updating step (S40), the filter coefficient is updated by performing the sign regressor LMS algorithm as described above.

In the error extracting step (S41), an error is extracted by using the subtraction signal and the equalization signal. The extracted error may be used in the filter coefficient calculation step (S44) or in the error variance calculation step (S42).

In the filter coefficient calculation step (S44), a filter coefficient of a current period is calculated according to Equation 2. By calculating the filter coefficient according to Equation 2, it can quickly adapt to a change in a channel, and the filter coefficient can be quickly converged.

In the updating step (S45), the filter coefficient calculated in the filter coefficient calculation step (S44) is delivered to the feedback signal generation step (S50).

The filter coefficient calculated in the filter coefficient calculation step (S44) may not be converged according to a channel environment. Thus, in order to avoid this problem, the error variance calculation step (S42) and the variance reduction determining step (S43) are additionally performed to fix the filter coefficient at a point at which the variance is minimized.

In the error variance calculation step (S42), a statistical variance of the error calculated in the error extraction step (S41) is calculated.

In the variance reduction determining step (S43), only in the case that the error variance calculated in the error variance calculation step (S42) have been reduced, the filter coefficient calculation step and the updating step are performed. When the error variance has been increased, the filter coefficient of the previous period is maintained, without calculating and updating the filter coefficient. Through this process, the filter coefficient is maintained at a point at which the variance is minimized, and thus, the filter coefficient can be prevented from being diverged.

The filter coefficient updating step according to an exemplary embodiment of the present invention can be more quickly adapted to the environment than the filter coefficient calculation methods employing the related art LMS algorithm does, and guarantee a stable operation.

As set forth above, in the equalizer and the equalization method employing an adaptive algorithm for high speed data transmissions according to exemplary embodiments of the invention, because only the feedback filter is used, the structure of the equalizer can be simplified.

Also, because a sign function is used, a converging speed of the filter coefficient calculated by the adapter can become faster.

In addition, because the filter coefficient is fixed at a point where the variance of an error value is minimized, the filter coefficient value can be prevented from diverging.

While the present invention has been shown and described in connection with the exemplary embodiments, it will be apparent to those skilled in the art that modifications and variations can be made without departing from the spirit and scope of the invention as defined by the appended claims.

What is claimed is:

1. An equalizer comprising:
   a subtraction unit subtracting a feedback signal from an input signal to generate a subtraction signal;
   a timing signal generation unit generating a sampling timing signal;
   an equalization signal generation unit equalizing the subtraction signal according to the sampling timing signal to generate an equalization signal; and
   a feedback signal generation unit calculating a filter coefficient value by using the subtraction signal and the equalization signal, delaying the equalization signal, and weighting the delayed equalization signal according to the filter coefficient value to generate a feedback signal,
   wherein the feedback signal generation unit comprises:
   an adapter unit obtaining the filter coefficient value according to a sign regressor least mean square (LMS) algorithm by using the subtraction signal and the equalization signal; and
   a filter unit sequentially delaying equalization signals and weighting each of the delayed equalization signals by using the filter coefficient value, wherein the adapter unit comprises:
an error extractor extracting an error value by using a load value and an equalization signal value of the equalization signal; and
a tap coefficient calculator calculating the filter coefficient value by using the error value and the equalization signal,
wherein the adapter unit further comprises a variance calculator calculating a statistical variance value of the error value, and the tap coefficient calculator compares a variance value calculated during a previous period and a variance value calculated during a current period, and when the variance value of the current period is smaller, the tap coefficient calculator calculates a filter coefficient value and updates it to the filter unit, whereas when the variance value of the current period is greater or equal, the tap coefficient calculator maintains the filter coefficient value of the previous period.

2. The equalizer of claim 1, wherein the variance value calculated by the variance calculator is a variance value of the square of the error value extracted by the error extractor.

3. The equalizer of claim 1, wherein the feedback signal generation unit further comprises a signal conversion unit converting an output signal from the filter unit into an analog signal.

4. The equalizer of claim 3, wherein the signal conversion unit comprises:
a zero order hold (ZOH) converting the output signal from the filter unit into an analog signal; and
a low pass filter (LPF) filtering the signal which has been converted by the ZOH.

5. The equalizer of claim 1, wherein the equalization signal generation unit comprises:
a sampling unit sampling the subtraction signal according to the timing signal to output a sampled signal; and
a slicing unit slicing the sampled signal to generate an equalization signal.

6. The equalizer of claim 5, wherein the equalization signal generation unit further comprises a delay buffer unit delaying the equalization signal and outputting the delayed equalization signal.

7. The equalizer of claim 1, wherein the equalizer is implemented in a sterilizer/deserializer.

8. An equalization method comprising:
a subtraction signal generation operation of subtracting a feedback signal, acquired from a signal during an immediately previous period, from an input signal to generate a subtraction signal;
an equalization operation of generating an equalization signal from the subtraction signal by using a sampling timing signal;
a filter coefficient updating operation of calculating a filter coefficient value by using the subtraction signal and the equalization signal and updating the filter coefficient value; and
a feedback signal generation operation of delaying the equalization signal and weighting the delayed equalization signal according to the calculated filter coefficient value to generate a feedback signal,
wherein the filter coefficient updating operation comprises:
an error value extraction operation of extracting an error value, a difference value between the subtraction signal and the equalization signal;
a variance value calculation operation of calculating a statistical variance value of the error signal; a variance value comparison operation of comparing the size of a variance value calculated during a previous period and that of the calculated variance value; and
a tap coefficient calculation operation of calculating the tap coefficient according to the sign regressor LMS algorithm by using the error value and the code value of the error value,
wherein when a variance value of the current period is smaller than a variance value calculated during a previous period in the variance value comparison operation, the tap coefficient calculation operation is performed, and when the variance value of the current period is greater than or equal to the variance value calculated during the previous period, the filter coefficient value of the previous period is maintained.

9. The method of claim 8, wherein the filter coefficient updating operation comprises:
an error value extraction operation of extracting an error value, a difference value between the subtraction signal and the equalization signal; and
a tap coefficient calculation operation of calculating a tap coefficient according to a sign regressor least mean square (LMS) algorithm by using the error value and a code value of the error value.

10. The method of claim 8, wherein the variance value is a variance value of the square of the error value extracted during the error value extraction operation.

11. The method of claim 8, further comprising: an output operation of outputting the equalization signal generated during the equalization operation.

* * * * *